(12) United States Patent
Jang et al.

(10) Patent No.: US 8,060,093 B2
(45) Date of Patent: Nov. 15, 2011

(54) HANDOVER SYSTEM AND METHOD IN A WIRELESS MOBILE COMMUNICATION SYSTEM

(75) Inventors: Jae-Hyuk Jang, Suwon-si (KR);
Hyoung-Kyu Lim, Seoul (KR);
Sung-Jin Lee, Seoul (KR); Jung-Je Son, Seongnam-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 754 days.

(21) Appl. No.: 12/196,539

(22) Filed: Aug. 22, 2008

(65) Prior Publication Data

US 2009/0054066 A1 Feb. 26, 2009

(30) Foreign Application Priority Data

Aug. 22, 2007 (KR) .................. 10-2007-0084654
Nov. 29, 2007 (KR) .................. 10-2007-0122890

(51) Int. Cl.
*H04W 36/00* (2009.01)

(52) U.S. Cl. ........ 455/436; 455/437; 455/442; 455/411; 455/439; 370/331

(58) Field of Classification Search .................. 455/436, 455/437, 442, 411, 438; 370/331
See application file for complete search history.

(56) References Cited

U.S. PATENT DOCUMENTS

2007/0086387 A1* 4/2007 Kang et al. .................... 370/331
2008/0089294 A1* 4/2008 Shon et al. .................... 370/331

* cited by examiner

*Primary Examiner* — Nick Corsaro
*Assistant Examiner* — Kathy Wang-Hurst
(74) *Attorney, Agent, or Firm* — Jefferson IP Law, LLP

(57) ABSTRACT

A handover method of a Mobile Station (MS) and a wireless mobile communication system are provided. The handover method includes sending a handover request message to a Serving Base Station (BS), receiving a handover response message including handover Target BS information and an entire Cipher-based Message Authentication Code (CMAC) value corresponding to a first number of bits, from the Serving BS in response to the handover request message, storing a partial CMAC value corresponding to a second number of Most Significant Bit (MSB) bits in the entire CMAC value, sending to the Serving BS a handover indication message including the entire CMAC value and information on a Target BS to which the MS has determined to handover, selecting a ranging code using the partial CMAC value, and sending the selected ranging code to the Target BS.

26 Claims, 12 Drawing Sheets

HANDOVER SYSTEM AND METHOD IN A WIRELESS MOBILE COMMUNICATION SYSTEM

PRIORITY

This application claims the benefit under 35 U.S.C. §119 (a) of a Korean patent application filed in the Korean Intellectual Property Office on Aug. 22, 2007 and assigned Serial No. 2007-84654, and a Korean patent application filed in the Korean Intellectual Property Office on Nov. 29, 2007 and assigned Serial No. 2007-122890, the entire disclosures of both of which are hereby incorporated by reference.

BACKGROUND OF THE INVENTION

1. Field of the Invention

The present invention relates to a wireless mobile communication system. More particularly, the present invention relates to a handover system and method in a wireless mobile communication system.

2. Description of the Related Art

For the next generation wireless mobile communication system, research is being conducted to provide users with high-speed services having various Quality of Service (QoS) classes. An exemplary next generation wireless mobile communication system includes a communication system based on Institute of Electrical and Electronics Engineers (IEEE) 802.16. In the next generation wireless mobile communication system, a Mobile Station (MS) can handover from its current cell to another cell.

FIG. 1 is a signaling diagram illustrating a conventional handover procedure in a wireless mobile communication system.

Referring to FIG. 1, an MS 100 determines if a condition to initiate handover has been satisfied, and when the condition is satisfied, the MS sends a handover request message (that is, Mobile MS Handover Request (MOB_MSHO-REQ) message) to a Serving Base Station (BS) (hereinafter referred to as 'SBS') 110 in step 101. It will be assumed herein that the MS 100 considers a Target BS1 (hereinafter referred to as "TBS1") 120 and a TBS2 130 as its handover target BSs. Therefore, the MOB_MSHO-REQ message includes therein information indicating TBS1 and information indicating TBS2. The TBS indication information can be an Identifier (ID) of its associated TBS.

The SBS 110 sends a HO-request message indicating the handover request of the MS 100 to each of the TBS1 120 and the TBS2 130 in steps 103 and 105.

The TBS1 120 and TBS2 130 each send a HO-response message, or response message to the received HO-request message, to the SBS 110 in steps 107 and 109. It is assumed herein that the TBSs are BSs that can accept the handover of the MS 100.

The SBS 110 sends to the MS 100 a handover response message (that is, Mobile BS Handover Response (MOB_BSHO-RSP) message) including information on the TBSs and Cipher-based Message Authentication Code (CMAC) information for message authentication in step 111. The CMAC can be determined herein as a different value according to the generated frame. In addition, the SBS 110 sends a Handover Acknowledgement (HO-ACK) message indicating its receipt of the HO-response message to each of the TBS1 120 and TBS2 130 in steps 113 and 115.

After determining a BS to which it intends to perform a handover, the MS 100 sends a handover indication message (that is, Mobile Handover Indication (MOB_HO-IND) message) including information on the determined BS and CMAC information to the SBS 110 in step 117. It is assumed herein that the MS 100 has selected the TBS2 130 as its handover target BS.

The SBS 110 sends to the TBS2 130 a HO-confirm message indicating that the MS 100 will soon handover thereto in step 119. Thereafter, the SBS 110 transfers context information of the MS 100 to the TBS2 130 in step 121.

The TBS2 130 sends a HO-ACK message indicating its receipt of the context information, to the SBS 110 in step 123.

The MS 100 sends a ranging code to the TBS2 130 in order to perform ranging with the TBS2 130 in step 125. The TBS2 130 sends a Ranging Response (RNG-RSP) message to the MS 100 in step 127. The RNG-RSP message is used for allocating resources so that the MS 100 can send an uplink Ranging Request (RNG-REQ) message. Therefore, the MS 100 sends an RNG-REQ message to the TBS2 130 using the allocated uplink resources in step 129. The RNG-REQ message includes CMAC tuple information.

The TBS2 130 sends an authentication request for the CMAC tuple to an authentication station 140 in step 131. The authentication station 140 generates an Authentication Key (AK) in step 133, and sends to the TBS2 130 an authentication response message including the generate AK information, i.e., AK context and Security Association (SA) information in step 135.

The TBS2 130 verifies the CMAC of the MS 100 in step 137, and when the CMAC is valid, sends an RNG-RSP message to the MS 100 in step 139. The RNG-RSP message includes a HO process optimization field and CMAC information. In addition, the TBS2 130 sends a confirm message for the authentication response message to the authentication station 140 in step 141. Thereafter, a data exchange is made between the MS 100 and the TBS2 130.

As described above, the TBS, to which the MS intends to perform a handover, should determine the correctness of a CMAC value of the MS after receiving authentication information from the authentication station. This means it is necessary to perform the same verification process for both a case where the TBS receives a normal RNG-REQ message from the MS and a case where the TBS receives a wrong RNG-REQ message. Therefore, resources needed for the verification may be wasted. In particular, when a plurality of MSs send incorrect messages after their intentional manipulation, the resources such as frequency resource, time resource and memory resource can be wasted.

SUMMARY OF THE INVENTION

An aspect of the present invention is to address at least the above-mentioned problems and/or disadvantages and to provide at least the advantages described below. Accordingly, an aspect of the present invention is to provide a system and method for reducing a waste of resources caused by authentication in a wireless mobile communication system.

According to one aspect of the present invention, a handover method of a Mobile Station (MS) in a wireless mobile communication system is provided. The handover method includes sending a handover request message to a Serving Base Station (BS), receiving a handover response message including handover target BS information and an entire Cipher-based Message Authentication Code (CMAC) value corresponding to a first number of bits, from the Serving BS in response to the handover request message, storing a partial CMAC value corresponding to a second number of Most Significant Bit (MSB) bits in the entire CMAC value, sending to the Serving BS a handover indication message including the entire CMAC value and information on a Target BS to which the MS has determined to handover, selecting a ranging code using the partial CMAC value, and sending the selected ranging code to the Target BS.

According to another aspect of the present invention, a handover support method of a Serving Base Station (BS) in a wireless mobile communication system is provided. The handover support method includes, upon receiving a handover request message from a Mobile Station (MS), negotiating with handover candidate Target BSs whether to accept the handover of the MS, determining an entire Cipher-based Message Authentication Code (CMAC) value corresponding to a first number of bits, storing a partial CMAC value corresponding to a second number of Most Significant Bit (MSB) bits in the CMAC value, and sending a message including the stored partial CMAC value to a Target BS to which the MS can handover.

According to further another aspect of the present invention, a handover support method of a Target Base Station (BS) to which a Mobile Station (MS) has determined to handover in a wireless mobile communication system is provided. The handover support method includes receiving from a Serving BS a message including a partial CMAC value corresponding to a second number of Most Significant Bit (MSB) bits in an entire Cipher-based Message Authentication Code (CMAC) value corresponding to a first number of bits, receiving from the MS a ranging code that the MS has selected using the partial CMAC value, and performing verification on the ranging code using the received ranging code and the partial CMAC value received from the Serving BS.

According to yet another aspect of the present invention, a wireless mobile communication system is provided. The system includes a Mobile Station (MS), a Serving Base Station (BS), and a Target BS to which the MS has determined to handover, wherein the MS sends a handover request message to the Serving BS, receives a handover response message including handover target BS information and an entire Cipher-based Message Authentication Code (CMAC) value corresponding to a first number of bits, from the Serving BS in response to the handover request message, stores a partial CMAC value corresponding to a second number of Most Significant Bit (MSB) bits in the entire CMAC value, sends a handover indication message including the entire CMAC value and the Target BS information to the Serving BS, selects a ranging code using the partial CMAC value, and sends the ranging code to the Target BS, further wherein upon receiving a handover request message from the MS, the Serving BS negotiates with handover candidate Target BSs whether to accept the handover of the MS, determines an entire CMAC value corresponding to a first number of bits, stores a partial CMAC value corresponding to a second number of MSB bits in the entire CMAC value, and sends a message including the stored partial CMAC value to a Target BS to which the MS can handover.

According to still another aspect of the present invention, a Fast Base Station Switching (FBSS) handover method of a Mobile Station (MS) in a wireless mobile communication system is provided. The FBSS handover method includes receiving from an Anchor Base Station (BS) a handover response message including information on a Target BS to which the MS can handover, determining an entire Cipher-based Message Authentication Code (CMAC) value corresponding to a first number of bits, storing a partial CMAC value corresponding to a second number of Most Significant Bit (MSB) bits in the entire CMAC value, selecting a codeword using the partial CMAC value, setting a value corresponding to some bits in the selected codeword as a short partial CMAC value, and sending the set short partial CMAC value to the Target BS to which the MS has determined to handover.

According to still another aspect of the present invention, a Fast Base Station Switching (FBSS) handover support method of a Target Base Station (BS) to which a Mobile Station (MS) has determined to handover in a wireless mobile communication system is provided. The FBSS handover support method includes receiving from a Serving BS a message including a partial CMAC value corresponding to a second number of Most Significant Bit (MSB) bits in an entire Cipher-based Message Authentication Code (CMAC) value corresponding to a first number of bits, selecting a codeword using one of a ranging code that the MS has selected using the partial CMAC value and the partial CMAC value, receiving from the MS one of the selected ranging code and a value corresponding to some bits in the codeword as a short partial CMAC value, and performing verification on the MS based on the received short partial CMAC value.

According to still another aspect of the present invention, a handover method of a Mobile Station (MS) in a wireless mobile communication system is provided. The handover method includes determining an entire Cipher-based Message Authentication Code (CMAC) value corresponding to a first number of bits, determining a code index using a partial CMAC value corresponding to a second number of Most Significant Bit (MSB) bits in the entire CMAC value, selecting a ranging code using the determined code index, and sending the selected ranging code to a handover target Base Station (BS).

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a Mobile Station (MS) handover system and method for strengthening security and reducing load using a partial value of the entire Cipher-based Message Authentication Code (CMAC) in a wireless mobile communication system. The partial CMAC value will be referred to herein as 'Shared Authentication Information (SAI)'.

Figure 1:
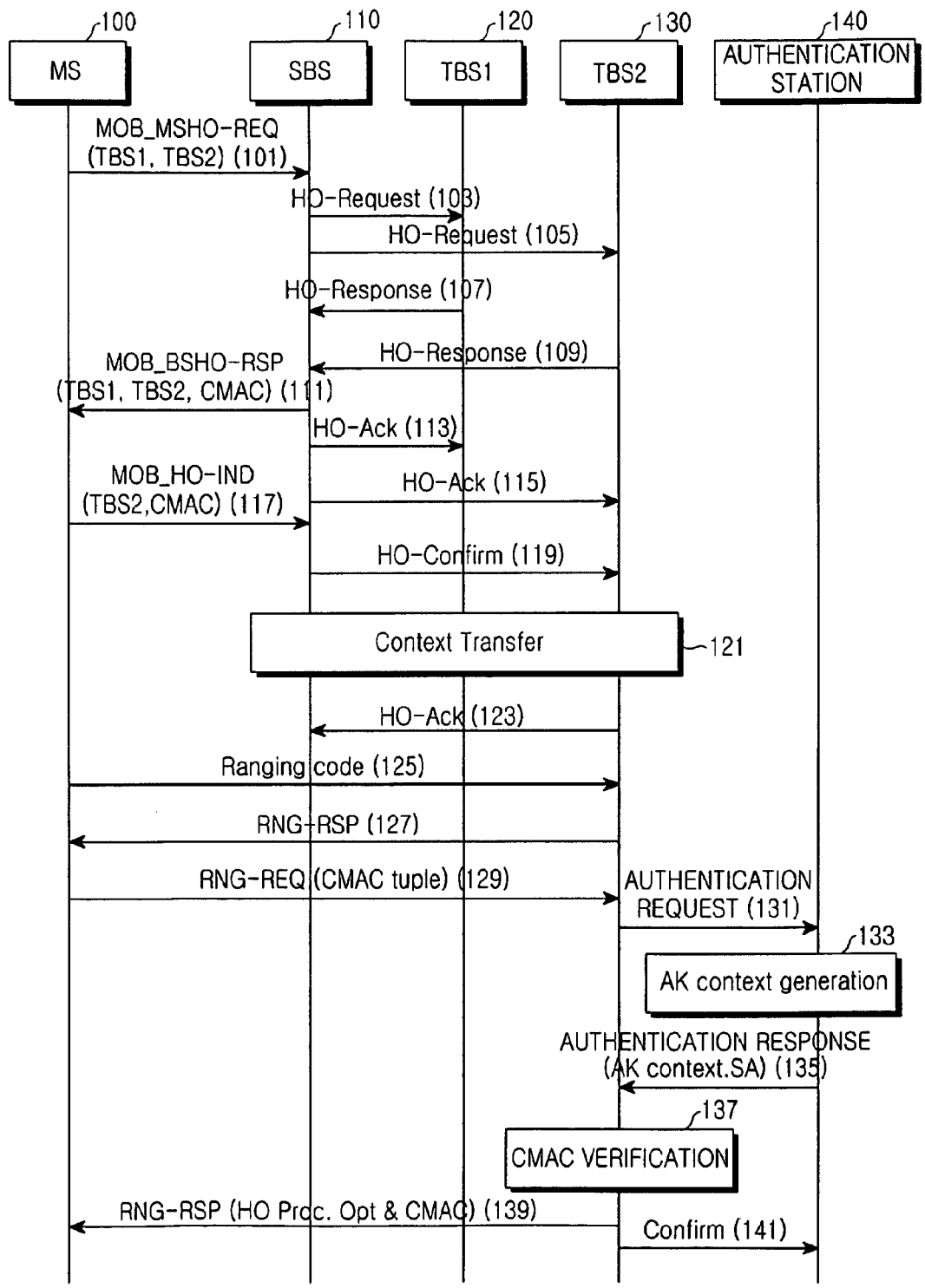
FIG. 1 is a signaling diagram illustrating a conventional handover procedure in a wireless mobile communication system.
Figure 2:
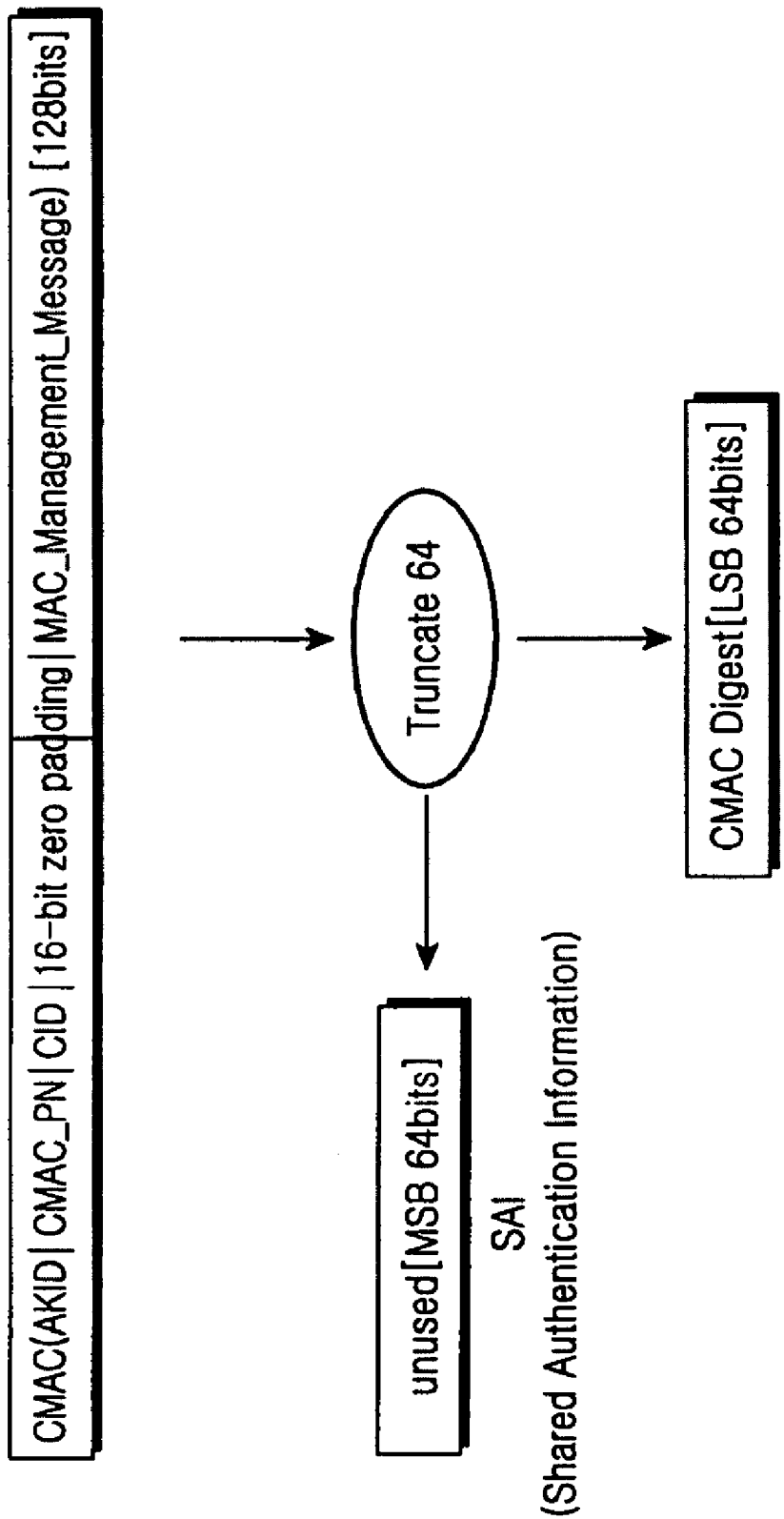
FIG. 2 is a diagram illustrating an operation of determining a partial CMAC value used for authentication of an MS according to an exemplary embodiment of the present invention.

FIG. 2 is a diagram illustrating an operation of determining a partial CMAC value used for authentication of an MS according to an exemplary embodiment of the present invention.

Referring to FIG. 2, the CMAC key CMAC_KEY, Authentication Key Identifier (AKID), CMAC packet number, counter and Connection Identifier (CID) are used for determination of the entire CMAC value.

There is a plurality of CMAC keys. Typically, the CMAC keys are classified into a downlink-dedicated CMAC key (CMAC_KEY_D) used for authenticating downlink messages, and an uplink-dedicated CMAC key (CMAC_KEY_U) used for authenticating uplink messages. The CMAC key is generated from an Authentication Key (AK), and the AK has its own unique identifier. Therefore, the AKID used for a determination of the CMAC value refers to an AKID of the AK from which the CMAC key is generated. In order to prevent a replay attack, packet number counters CMAC_PN_U and CMAC_PN_D for uplink and downlink are used. Each packet number counter has a 4-byte value, and its count value increases every time one packet is transmitted. The CID is a connection identifier that a BS uniquely allocates to an MS. The entire CMAC value can be expressed as Equation (1).

$$\text{CMAC value} <= \text{Truncate } 64(\text{CMAC}(\text{CMAC\_KEY\_*}, \text{AKID}|\text{CMAC\_PN}|\text{CID}|\text{16-bit zero padding}|\text{MAC\_Management Message}) \quad (1)$$

'Truncate 64' in FIG. 2 and Equation (1) refers to a function of truncating the leading 64 bits (or 64 Most Significant Bit (MSB) bits) and the rear 64 bits (or 64 Least Significant Bit (LSB) bits) from the entire 128-bit CMAC value. Herein, a value corresponding to the leading 64 bits is a SAI.

Figure 3:
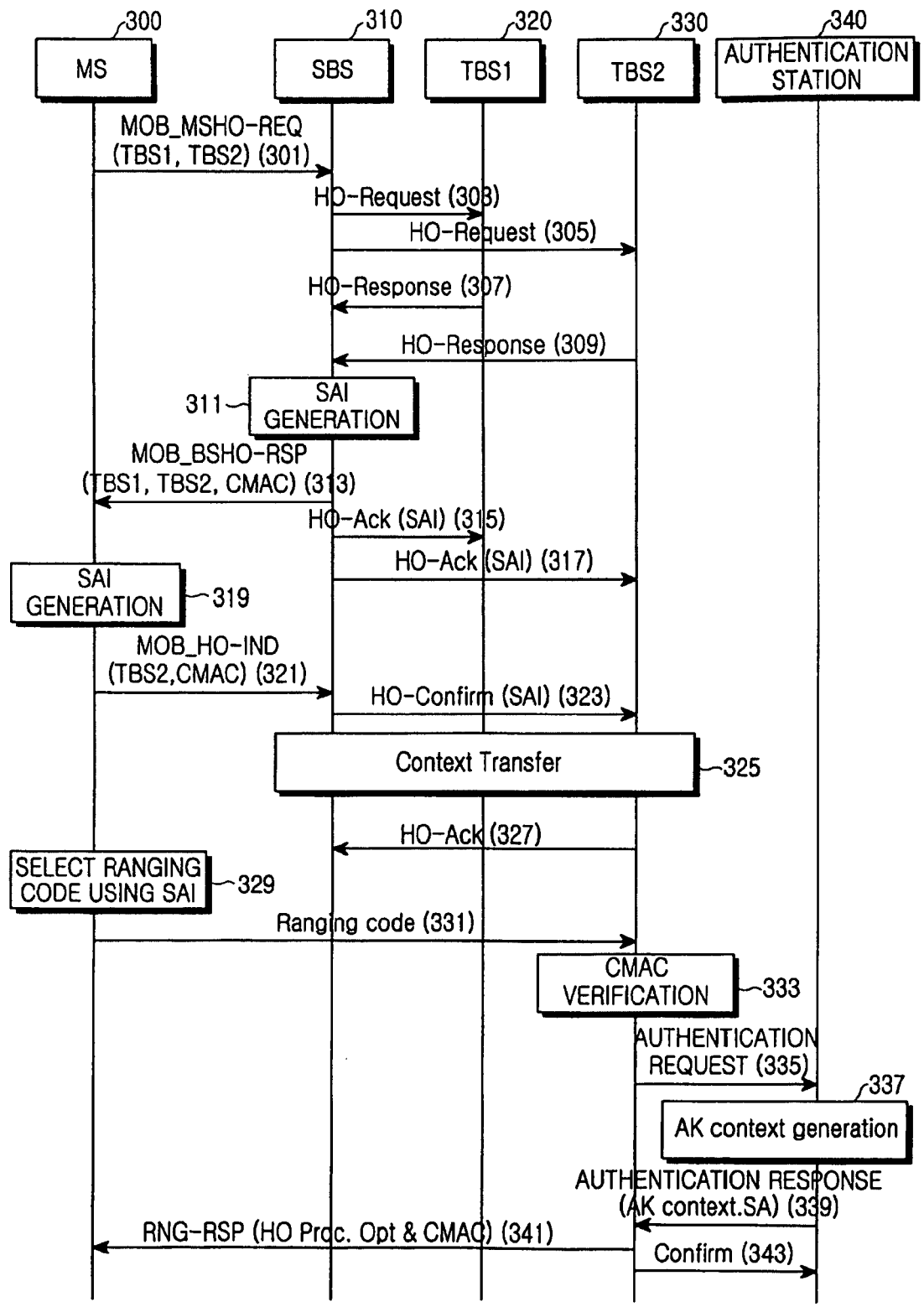
FIG. 3 is a signaling diagram illustrating a procedure related to a handover of an MS in a wireless mobile communication system according to an exemplary embodiment of the present invention.

FIG. 3 is a signaling diagram illustrating a procedure related to a handover of an MS in a wireless mobile communication system according to an exemplary embodiment of the present invention.

Referring to FIG. 3, an MS 300 determines if it satisfies a handover condition, and when it satisfies the handover condition, sends a handover request message (Mobile MS Handover Request (MOB_MSHO-REQ) message) to a Serving Base Station (BS) (hereinafter referred to as 'SBS') 310 in step 301. It is assumed herein that the MS 300 considers a Target BS1 (hereinafter referred to as TBS1) 320 and a TBS2 330 as its handover target BSs. Therefore, the MOB_MSHO-REQ message includes therein information indicating the TBS1 320 and information indicating the TBS2 330. The TBS indication information can be an Identifier (ID) of its associated TBS.

The SBS 310 sends a HO-request message indicating the handover request of the MS 300 to each of the TBS1 320 and TBS2 330 in steps 303 and 305.

The TBS1 320 and TBS2 330 each send a HO-response message, or response message to the received HO-request message, to the SBS 310 in steps 307 and 309. It is assumed herein that the TBSs are BSs that can accept the handover of the MS 300.

The SBS 310 generates the entire CMAC value to acquire SAI, and stores the acquired SAI in step 311. Acquiring SAI will be referred to herein as 'generating SAI'. Thereafter, the SBS 310 sends to the MS 300 a handover response message, or a Mobile BS Handover Response (MOB_BSHO-RSP) message including information on the TBS to which the MS 300 can handover, and Cipher-based Message Authentication Code (CMAC) information for message authentication in step 313.

In addition, the SBS 310 sends a Handover Acknowledgement (HO-ACK) message indicating its receipt of the HO-response message to each of the TBS1 320 and TBS2 330 in steps 315 and 317. The HO-ACK message includes the SAI information generated by the SBS 310.

Meanwhile, the MS 300 generates SAI using the CMAC information, and stores the generated SAI in step 319. After determining a BS to which it intends to handover, the MS 300 sends to the SBS 310 a handover indication message, or a Mobile Handover Indication (MOB_HO-IND) message including therein the determined BS's information and CMAC information in step 321. It is assumed herein that the MS 300 has selected the TBS2 330 as its handover target BS.

The SBS 310 sends to the TBS2 330 a HO-confirm message indicating that the MS 300 will soon perform handover thereto in step 323. In this case, the SBS 310 can retransmit to the TBS2 330 the SAI information generated in step 311 along with the HO-confirm message. If the system is configured to include SAI in only one of the HO-ACK message and the HO-confirm message, SAI verification in step 333 uses the SAI included in the respective message. For example, the TBS2 330 compares the ranging code received from the MS 300 with a ranging code corresponding to a code index determined using Equations (2) and (4) (described below) to determine a match between them, thereby checking whether the SAI is a correct value. Thereafter, the SBS 310 transfers context information of the MS 300 to the TBS2 330 in step 325.

The TBS2 330 sends a HO-ACK message indicating its receipt of the context information to the SBS 310 in step 327.

Meanwhile, the MS 300 selects a ranging code using the generated SAI in step 329. There are various possible schemes as an operation of selecting a ranging code using the SAI, and two schemes will be described below by way of example.

A first scheme determines a code index using a function of defining SAI as an input value, and this can be mathematically expressed as Equation (2).

$$\text{code index} = f(\text{SAI}(64 \text{ bits})) \quad (2)$$

In Equation (2), f( ) refers to a function used for extracting a code index, and there is a modulo function as a simplest type of the function. In the conventional Institute of Electrical and Electronics Engineers (IEEE) 802.16-based communication system, the total number of available codes is 256. If it is assumed that of the 256 codes, 128 codes should be used for initial ranging, periodic ranging, and resource request ranging, and the remaining 128 codes are surplus codes, Equation (2) can be rewritten as Equation (3).

$$\text{code index} = \text{SAI} \bmod 128 \quad (3)$$

A second scheme determines a code index using a function of defining a frame number as an input value. The frame number is used for preventing the replay attack. That is, the code index should change for every frame in order to prevent a malicious MS from fraudulently repeatedly transmitting a code of the normal MS to the BS. The frame number is a value prescribed between the MS and the BS. The code index determined using the frame number can be expressed as Equation (4).

$$\text{code index} = g(\text{SAI}(64 \text{ bits}), (\text{LSB of}) \text{ frame number } (x \text{ bits})) \quad (4)$$

In Equation (4), g( ) refers to a function used for extracting a code index, and the frame number can use the full length or can use only x LSB bits. In order to determine the code index in the form of Equation (4), concatenation and modulo calculation can be used. That is, the second scheme performs modulo calculation on a value obtained by simply concatenating the SAI value to the frame number. When there are 128 surplus codes as in the first scheme, the code index determined using the SAI and the frame number can be expressed as Equation (5).

$$\text{code index} = (\text{SAI} | \text{LSB of frame number}) \bmod 128 \quad (5)$$

The MS 300 sends a ranging code indicating its handover decision to the TBS2 330 in step 331. The TBS2 330 estimates the code the MS 300 will transmit, using the same algorithm as the algorithm used for determining a code index in the MS 300, and checks if the received ranging code is identical to the ranging code transmitted by the MS 300 in step 333. This is possible because the TBS2 330 has previously received a SAI value from the SBS 310 and stored it therein. Such a MS verification procedure is available even without interworking with an authentication station. Therefore, when a malicious MS makes a replay attack, it is possible to minimize the resources wasted by a signaling load for verification and verification failure.

The TBS2 330 sends an authentication request for the MS 300 to an authentication station 340 in step 335. The authentication station 340 generates an Authentication Key (AK) in step 337, and sends to the TBS2 330 an authentication response message including the generated AK information, i.e., AK context and Security Association (SA) information in step 339.

The TBS2 330 sends an RNG-RSP message to the MS 300 in step 341. The RNG-RSP message includes a HO process optimization field and CMAC information. In addition, the TBS2 330 sends a confirm message for the authentication response message to the authentication station 340 in step 343. Thereafter, a data exchange is made between the MS 300 and the TBS2 330.

Figure 4:
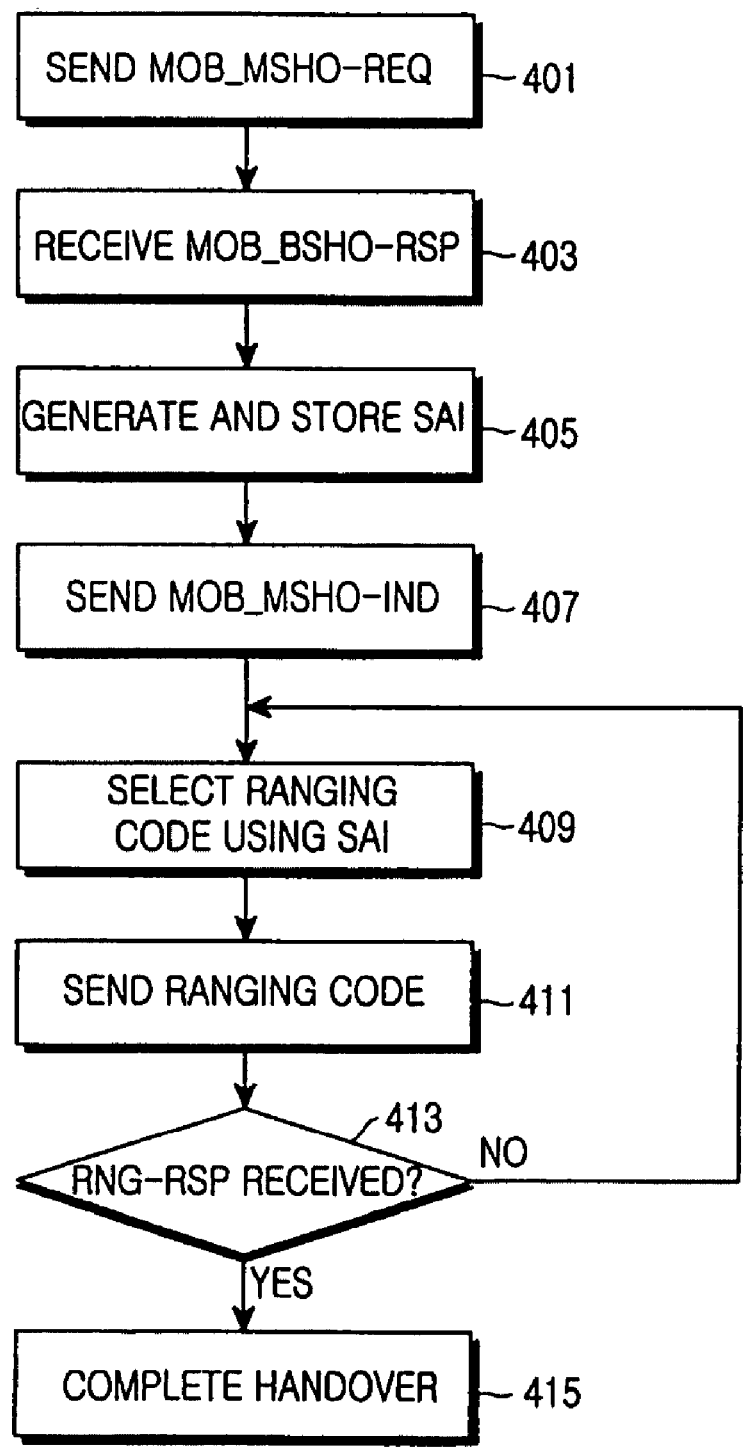
FIG. 4 is a flowchart illustrating a handover operation of an MS according to an exemplary embodiment of the present invention.

FIG. 4 is a flowchart illustrating a handover operation of an MS according to an exemplary embodiment of the present invention.

Referring to FIG. 4, in step 401, the MS sends a MOB_M-SHO-REQ message for a handover request to an SBS. In step 403, the MS receives a MOB_BSHO-RSP message from the SBS. In step 405, the MS generates and stores SAI. In step 407, the MS sends to the SBS a MOB_HO-IND message indicating a handover target BS, i.e., TBS information. In step 409, the MS selects a ranging code using the stored SAI. In step 411, the MS sends the selected ranging code to the TBS. In step 413, the MS determines if it has received an RNG-RSP message from the TBS. Upon receipt of the RNG-RSP message, the MS completes the handover procedure of the MS in step 415. Otherwise, if the MS has failed to receive the RNG-RSP message within a preset time, the handover procedure returns to step 409.

Figure 5:
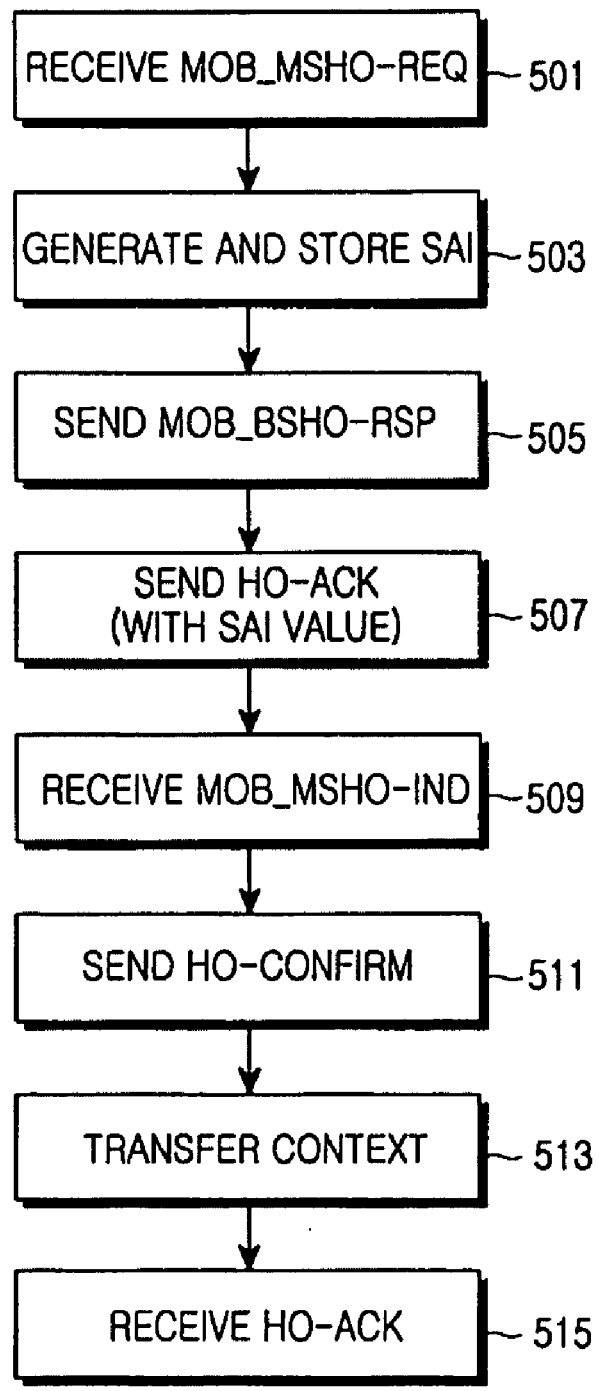
FIG. 5 is a flowchart illustrating a handover-related operation of an SBS according to an exemplary embodiment of the present invention.

FIG. 5 is a flowchart illustrating a handover-related operation of an SBS according to an exemplary embodiment of the present invention.

Referring to FIG. 5, in step 501, the SBS receives a MOB_MSHO-REQ message from an MS. In step 503, the SBS generates and stores SAI. In step 505, the SBS sends a MOB_BSHO-RSP message to the MS. In step 507, the SBS sends a HO-ACK message including the generated SAI to TBSs. In step 509, the SBS receives a MOB_HO-IND message from the MS. In step 511, the SBS sends a HO-confirm message to the TBS to which the MS intends to handover. In step 513, the SBS transfers context information of the MS to the TBS. In step 515, the SBS receives a HO-ACK message from the TBS.

Figure 6:
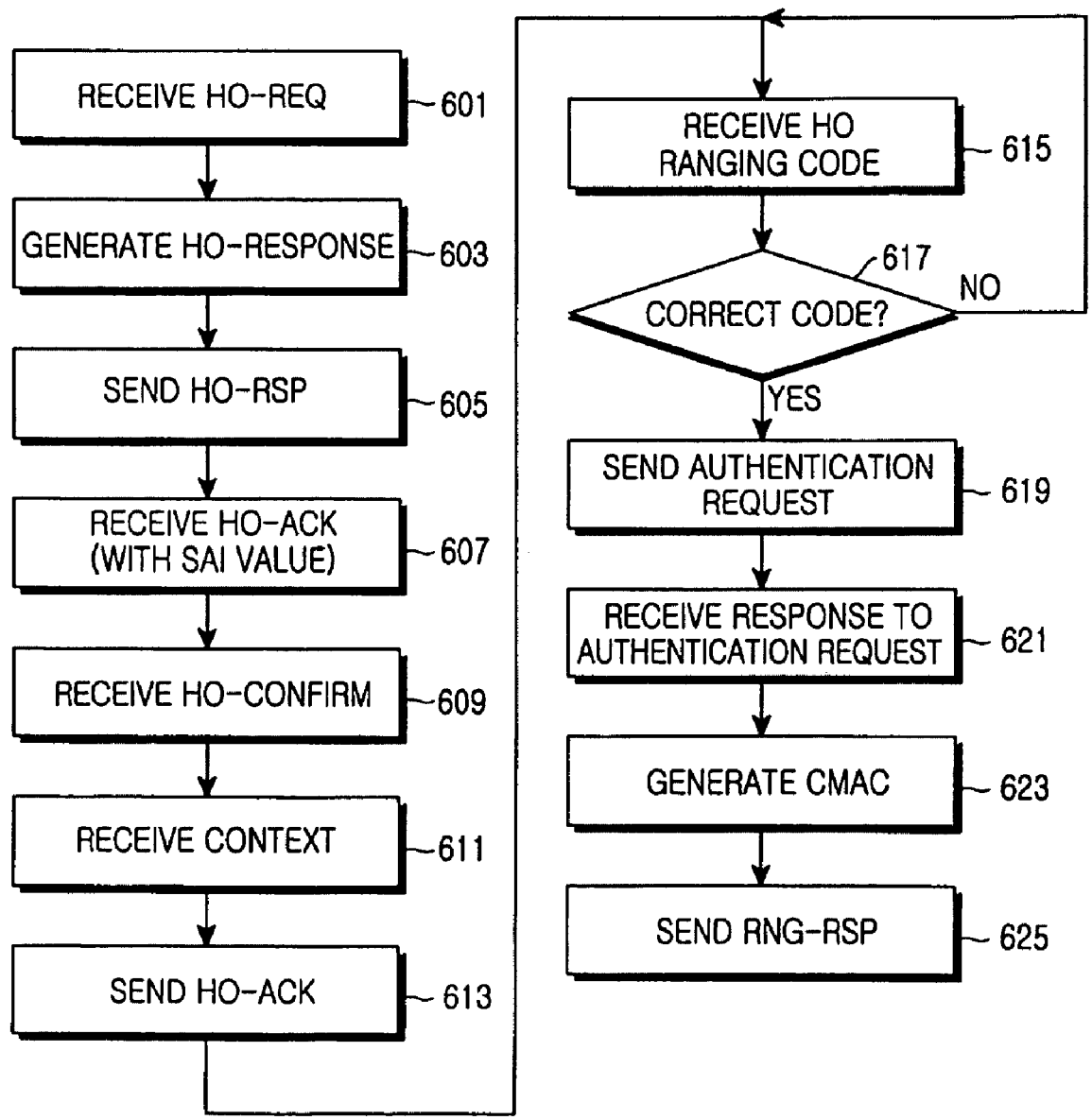
FIG. 6 is a flowchart illustrating a handover-related operation of a TBS according to an exemplary embodiment of the present invention.

FIG. 6 is a flowchart illustrating a handover-related operation of a TBS according to an exemplary embodiment of the present invention.

Referring to FIG. 6, in step 601, the TBS receives a HO-REQ message from an SBS. In step 603, the TBS generates a HO-RSP message and then proceeds to step 605. It is assumed herein that the TBS is a Target BS to which the MS intends to handover. In step 605, the TBS sends the generated HO-RSP message to the SBS. In step 607, the TBS receives from the SBS a HO-ACK message including SAI. In step 609, the TBS receives a HO-confirm message from the SBS. In step 611, the TBS receives context information of the MS from the SBS.

In step 613, the TBS sends a HO-ACK message to the SBS. In step 615, the TBS receives from the MS a ranging code selected using SAI. In step 617, the TBS checks if the ranging code is a correct code. If it is determined that the ranging code is not a correct code, the process returns to step 615. If it is determined that the ranging code is a correct code, the TBS sends an AK request to an authentication station in step 619. In step 621, the TBS receives an authentication response including AK context and SA information. In step 623, the TBS generates a CMAC. In step 625, the TBS sends an RNG-RSP message including the CMAC to the MS.

Meanwhile, the conventional IEEE 802.16-based communication system supports Fast Base Station Switching (FBSS)

for fast handover of an MS. However, the current FBSS handover procedure has a problem with security since it has no authentication procedure. Therefore, an exemplary embodiment of the present invention provides an FBSS handover scheme whose security is strengthened using a ranging code or a codeword determined using the SAI.

Figure 7:
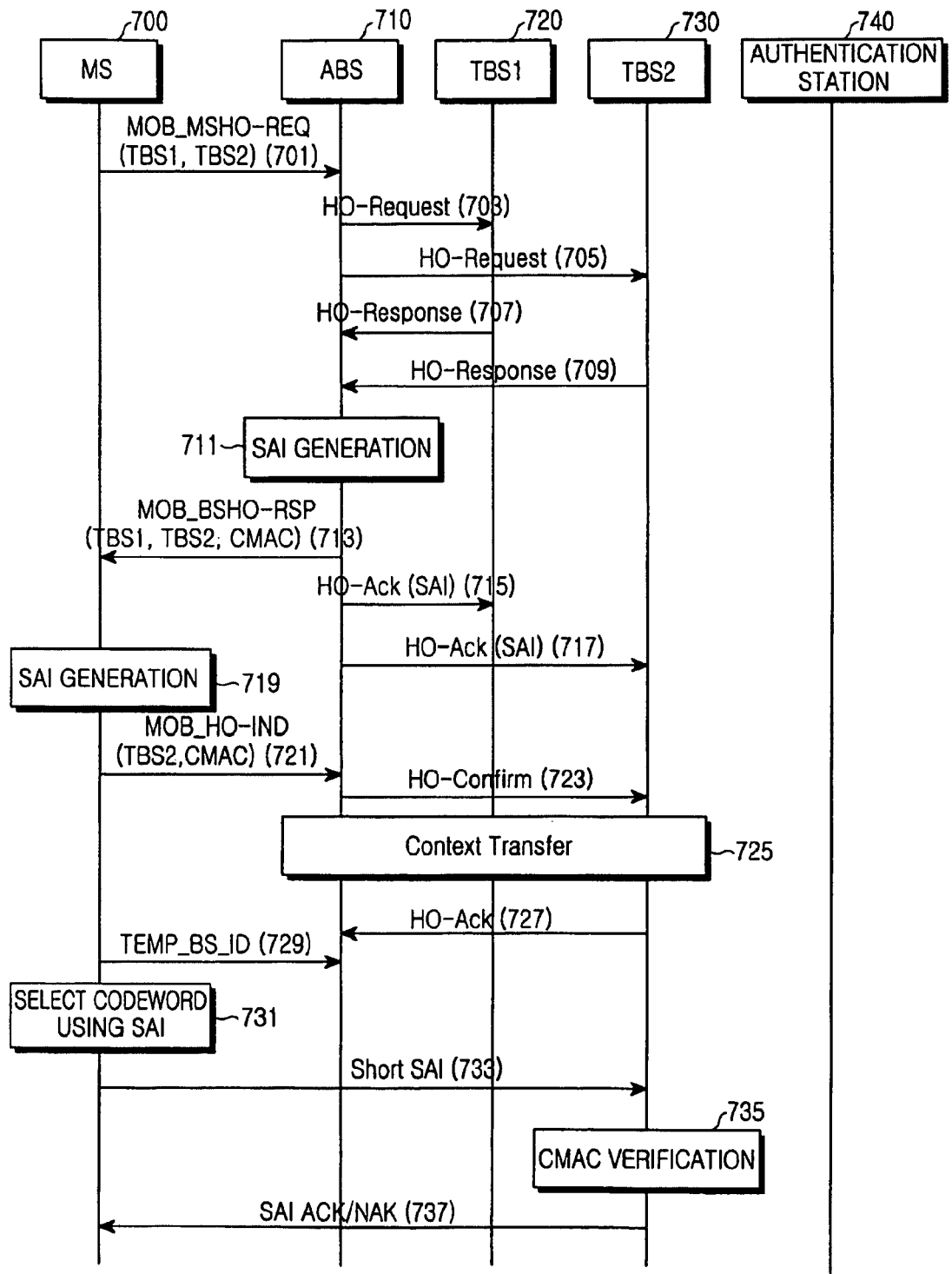
FIG. 7 is a signaling diagram illustrating a procedure related to FBSS handover of an MS based on codeword selection according to an exemplary embodiment of the present invention.

FIG. 7 is a signaling diagram illustrating a procedure related to FBSS handover of an MS based on codeword selection according to an exemplary embodiment of the present invention.

Referring to FIG. 7, an MS 700 manages its active set. The active set is a list of candidate BSs to which the MS will handover. If a received signal strength of a particular BS included in the active set is less than a preset threshold, the particular BS is deleted from the active set. On the contrary, if received signal strength of a particular BS not included in the active set is greater than or equal to the threshold, the particular BS is added to the active set.

The MS 700 sends a MOB_MSHO-REQ message to an Anchor BS (ABS) 710 in order to add TBS1 720 and TBS2 730 to its active set in step 701. The MOB_MSHO-REQ message includes therein identifier information of the TBS1 720 and TBS2 730.

The ABS 710 sends a HO-request message to each of the TBS1 720 and TBS2 730 in steps 703 and 705. The TBS1 720 and TBS2 730 each determine if they will approve their addition to the active set, and send a HO-response message including the determined information to the ABS 710 in steps 707 and 709.

The ABS 710 generates SAI while generating a CMAC, and stores the generated SAI in step 711. The ABS 710 sends to the MS 700 a MOB_BSHO-RSP message including therein the CMAC and the Target BSs that approved their addition to the active set, i.e., information on the TBS1 720 and TBS2 730 in step 713. In addition, the ABS 710 sends a HO-ACK message to each of the TBS1 720 and TBS2 730 in steps 715 and 717. The HO-ACK message includes SAI.

Meanwhile, the MS 700 generates SAI using the CMAC included in the MOB_BSHO-RSP message, and stores the generated SAI in step 719. After determining a BS to which it intends to handover, the MS 700 sends to the ABS 710 a MOB_HO-IND message including therein the determined BS information and the CMAC information in step 721. It is assumed herein that the MS 700 has selected the TBS2 730 as its handover target BS.

The ABS 710 sends to the TBS2 730 a HO-confirm message indicating that the MS 700 will soon handover thereto in step 723. The HO-confirm message can also include SAI information. If it is agreed in the system to include SAI in only one of the HO-ACK message and the HO-confirm message, SAI verification in step 735 uses the included SAI. If SAI is included in both of the two messages, the handover target BS of the MS verifies the MS using only one preset SAI.

The ABS 710 transfers context information of the MS 700 to the TBS2 730 in step 725. The TBS2 730 sends to the ABS 710 a HO-ACK message indicating its receipt of the context information in step 727.

Thereafter, in order to handover to a particular BS among the BSs included in its active set, the MS 700 sends to the ABS 710 a temporary BS identifier TEMP_BS_ID corresponding to the particular BS in step 729. The TEMP_BS_ID is transmitted herein through a Fast Feedback Channel (FFCH). In the above, the TBS2 included in the HO-IND message refers to a candidate BS to which the MS 700 can handover anytime, i.e., the TBS2 is included in an active BS set. If the MS desires to handover to the TBS2, it should send the TEMP_BS_ID corresponding to the TBS2 in order to trigger the actual handover.

The MS 700 selects a codeword using the stored SAI in step 731. The number of bits of a codeword transmitted over FFCH defined in the conventional IEEE 802.16 standard is 6. Therefore, the MS 700 sends a 6-bit Short SAI, or a 6-bit codeword, to the TBS2 730 over the FFCH in step 733. The Short SAI can also be generated using Equation (2) or (4), and in this case, a modulo-64 function can be used as its modulo function.

The TBS2 730 performs authentication on the MS 700 using the SAI received from the ABS 710 in step 735. The TBS2 730 sends a SAI ACK/NAK message including the authentication result to the MS 700 in step 737. Thereafter, the MS 700 exchanges data with the TBS2 730, and transmits its Channel Quality Information (CQI) over the allocated FFCH.

Figure 8:
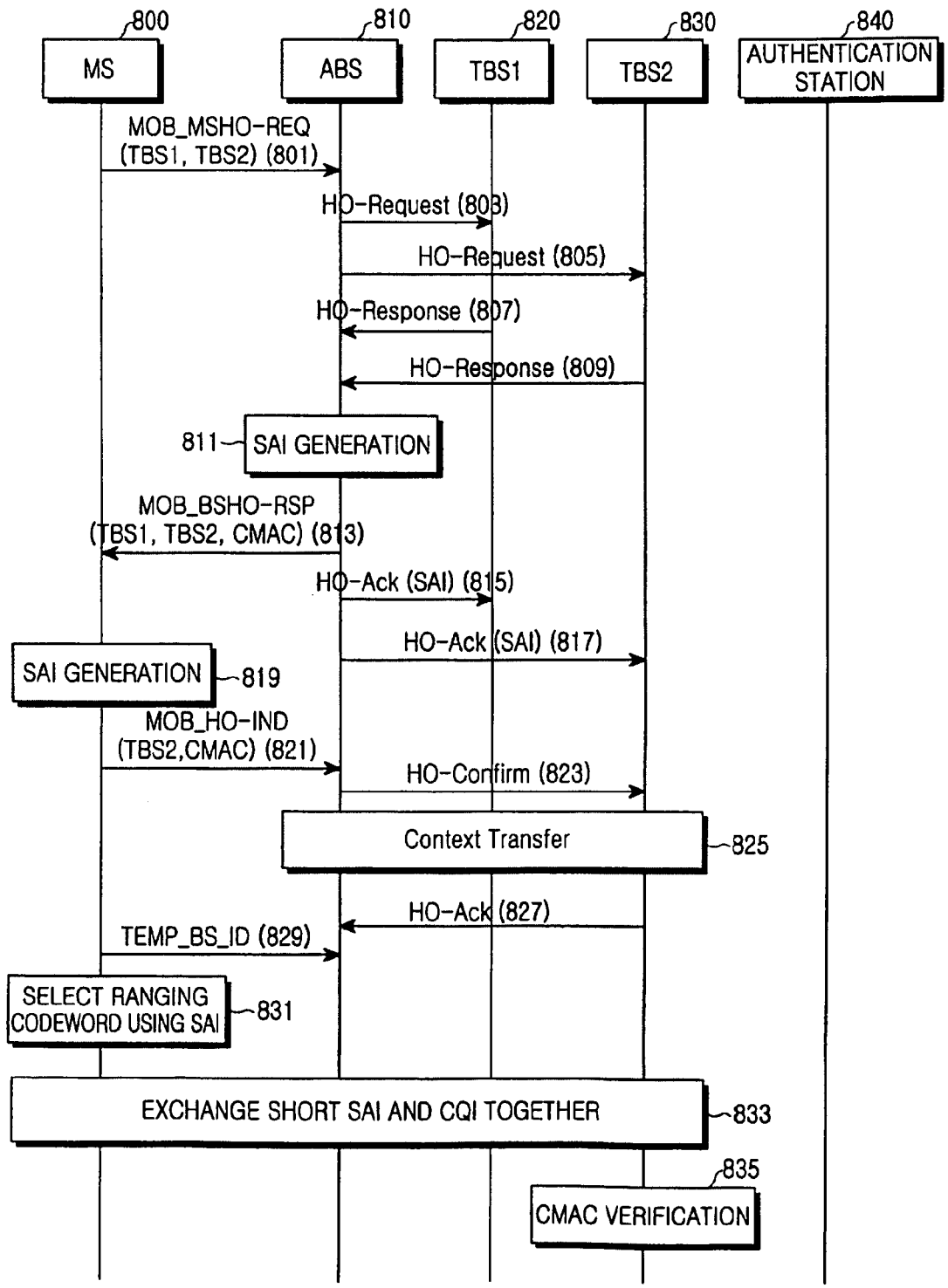
FIG. 8 is a signaling diagram illustrating a procedure related to FBSS handover of an MS based on code selection according to an exemplary embodiment of the present invention.

FIG. 8 is a signaling diagram illustrating a procedure related to FBSS handover of an MS based on code selection according to an exemplary embodiment of the present invention.

Referring to FIG. 8, since steps 801 through 829 are similar to steps 701 through 729 of FIG. 7, a detailed description thereof will be omitted for conciseness. In step 831, an MS 800 selects a ranging code or a Short SAI, using SAI. Thereafter, the MS 800 sends CQI to the TBS2 830 along with the Short SAI in step 833. The TBS2 830 performs verification on the MS 800 using the previously stored SAI and the ranging code received from the MS 800 in step 835.

Figure 9:
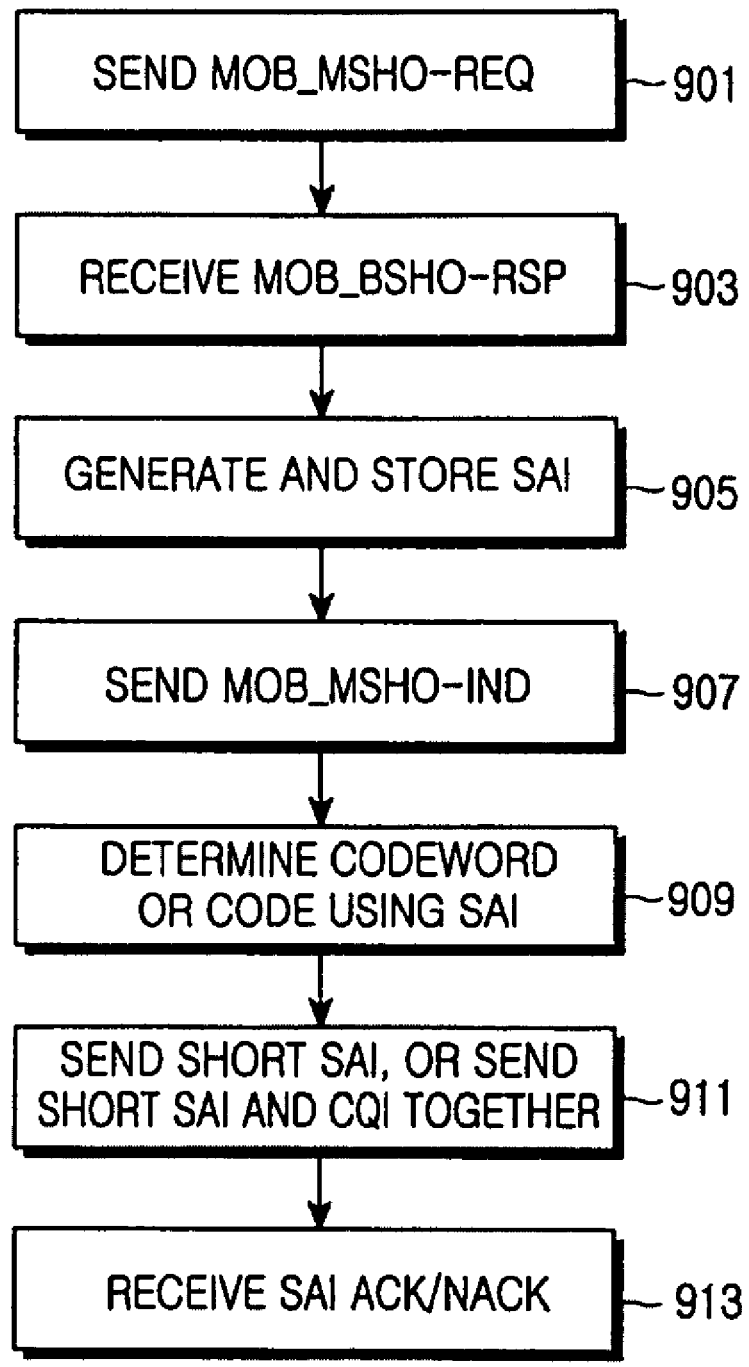
FIG. 9 is a flowchart illustrating a handover operation of an MS according to an exemplary embodiment of the present invention.

FIG. 9 is a flowchart illustrating a handover operation of an MS according to an exemplary embodiment of the present invention.

Referring to FIG. 9, in step 901, the MS sends a MOB_MSHO-REQ message for a handover request to an ABS. In step 903, the MS receives a MOB_BSHO-RSP message from the ABS. In step 905, the MS generates and stores SAI. In step 907, the MS sends to the ABS a MOB_HO-IND message including a handover target BS or TBS information. In step 909, the MS determines a codeword or ranging code using the stored SAI. In step 911, the MS sends Short SAI to the TBS or sends CQI to the TBS together with Short SAI. In step 913, the MS receives a SAI ACK/NAK message.

Figure 10:
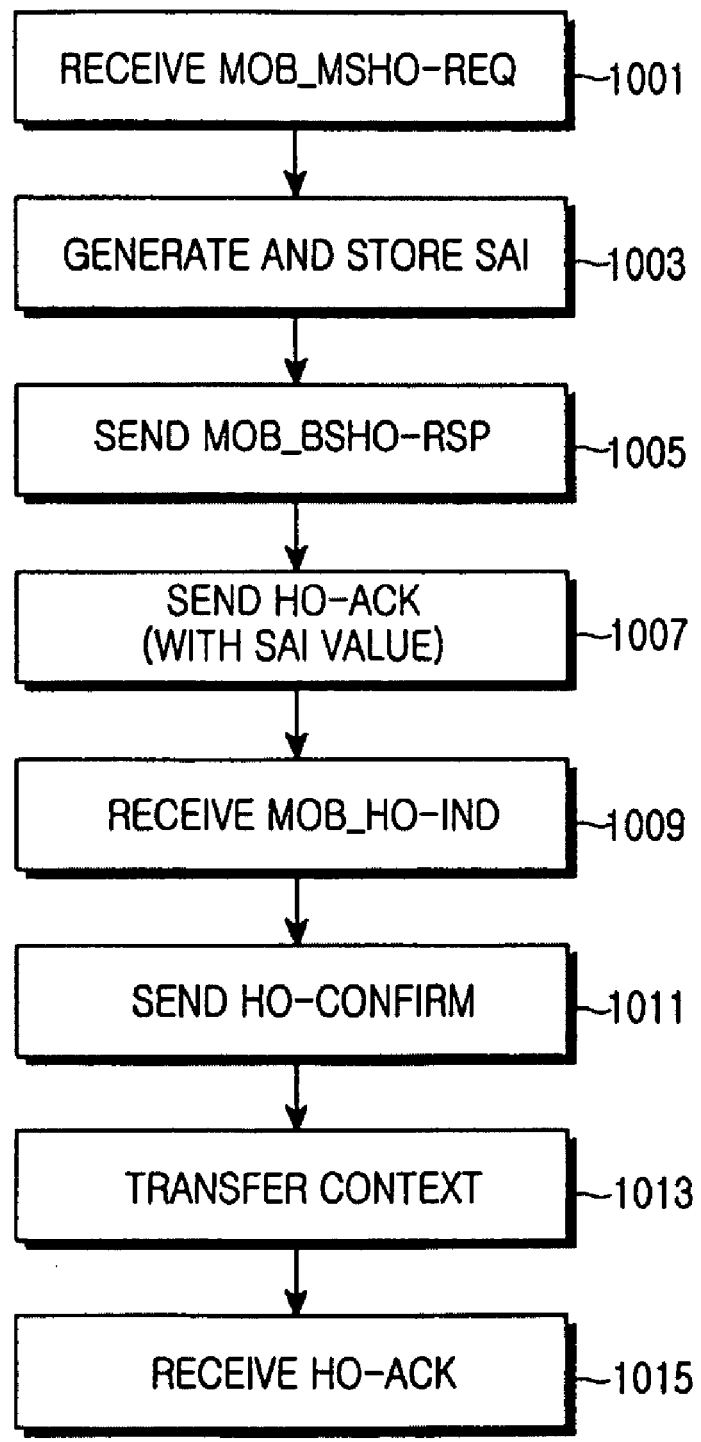
FIG. 10 is a flowchart illustrating a handover-related operation of an ABS according to an exemplary embodiment of the present invention.

FIG. 10 is a flowchart illustrating a handover-related operation of an ABS according to an exemplary embodiment of the present invention.

Referring to FIG. 10, in step 1001, the ABS receives a MOB_MSHO-REQ message from an MS. In step 1003, the ABS generates and stores SAI. In step 1005, the ABS sends a MOB_BSHO-RSP message to the MS. In step 1007, the ABS sends a HO-ACK message including the generated SAI to TBSs. In step 1009, the ABS receives a MOB_HO-IND message from the MS. In step 1011, the ABS sends a HO-confirm message to a TBS to which the MS intends to handover. In step 1013, the ABS transfers context information of the MS to the TBS. In step 1015, the ABS receives a HO-ACK message from the TBS.

Figure 11:
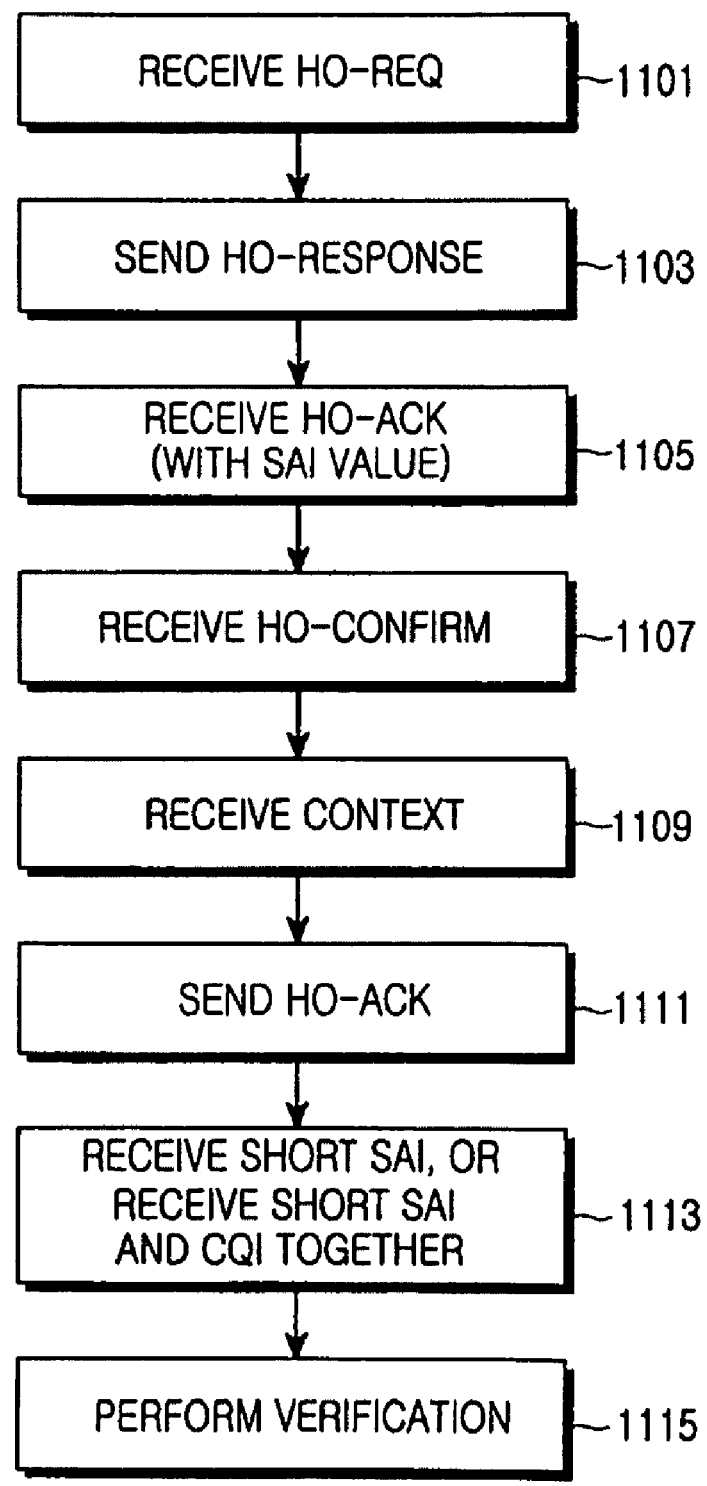
FIG. 11 is a flowchart illustrating a handover-related operation of a TBS according to an exemplary embodiment of the present invention.

FIG. 11 is a flowchart illustrating a handover-related operation of a TBS according to an exemplary embodiment of the present invention.

Referring to FIG. 11, in step 1101, the TBS receives a HO-REQ message from an ABS. In step 1103, the TBS sends a HO-RSP message. In step 1105, the TBS receives a HO-ACK message including SAI from the ABS. In step 1107, the TBS receives a HO-confirm message from the ABS. In step 1109, the TBS receives context information of the MS from the ABS.

In step 1111, the TBS sends a HO-ACK message to the ABS. In step 1113, the TBS receives Short SAI from the MS, or receives Short SAI and CQI together from the MS. In step 1115, the TBS performs verification on the MS.

Figure 12:
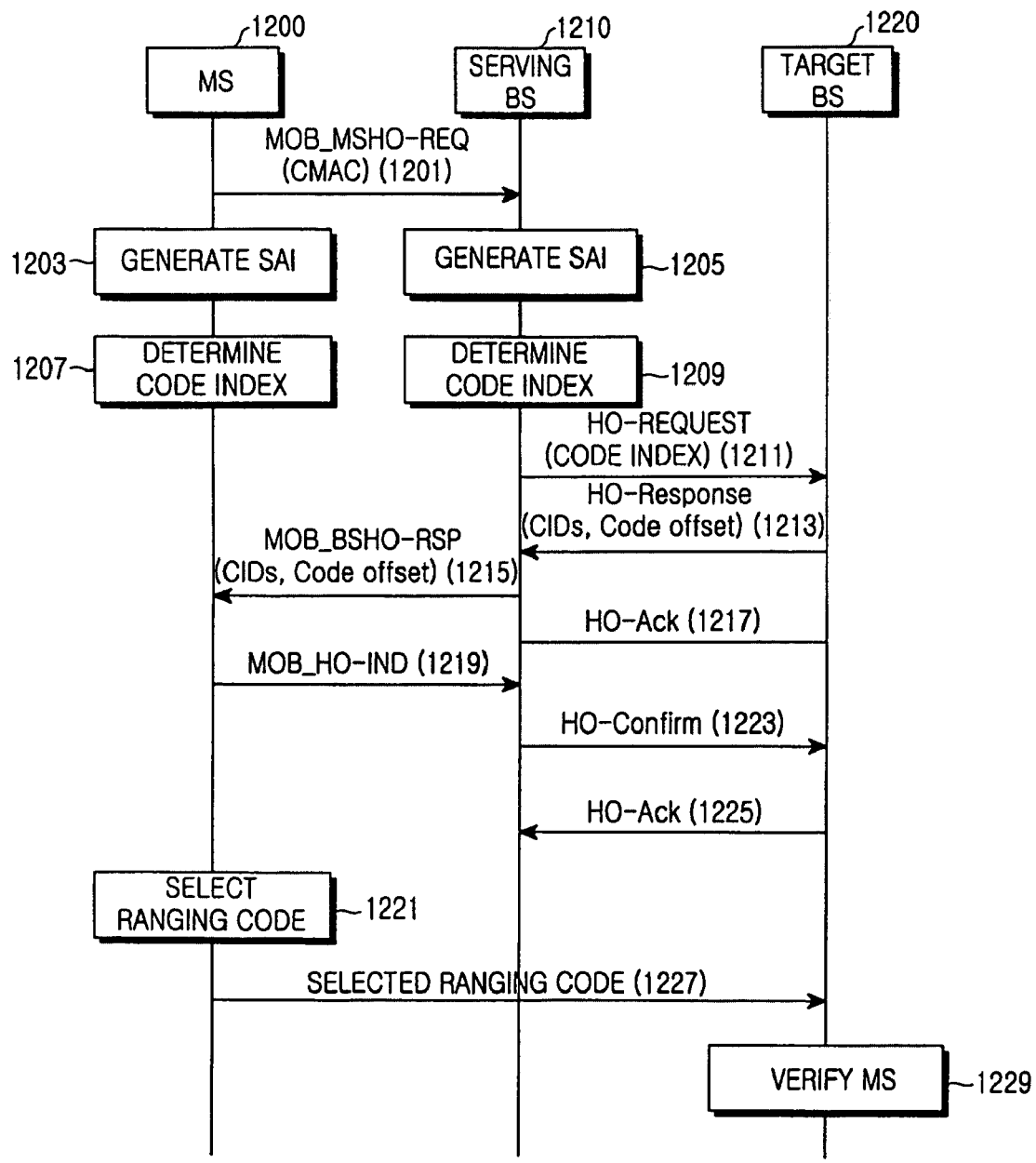
FIG. 12 is a signaling diagram illustrating a SAI-based process in a wireless mobile communication system according to an exemplary embodiment of the present invention.

FIG. 12 is a signaling diagram illustrating a SAI-based process in a wireless mobile communication system according to an exemplary embodiment of the present invention.

Referring to FIG. 12, after determining to handover to a Target BS 1220, an MS 1200 sends a MOB_MSHO-REQ message to a Serving BS 1210 in step 1201. The MOB_MSHO-REQ message includes a CMAC value for message authentication. The MS 1200 and the Serving BS 1210 each generate their SAI in steps 1203 and 1205.

The MS 1200 and the Serving BS 1210 each determine their code index using the generated SAI and any one of Equations (2) through (5) in steps 1207 and 1209.

The Serving BS 1210 sends to the Target BS 1220 a handover request (HO-request) message indicating the handover of the MS 1200 in step 1211. The handover request message includes the code index information determined by the Serving BS 1210.

The Target BS 1220 determines if the code index overlaps with the code which was previously used for another purpose, for example, initial ranging, periodic ranging and bandwidth request ranging, or with the code that the MS attempting the handover has selected. If the code index does not overlap, the Target BS 1220 sends a handover response (HO-Response) message to the Serving BS 1210 in step 1213. The handover response message includes a Connection Identifier (CID) for the MS 1200, and when necessary, includes a code offset. The code offset is used not only for identifying the MS 1200 but also for preventing possible collision with another code.

The Serving BS 1210 sends a MOB_BSHO-RSP message to the MS 1200 in step 1215, and receives a MOB_HO-IND message from the MS 1200 in step 1219. The MOB_BSHO-RSP message can include a CID, or can include a CID and a code offset together. Meanwhile, the Serving BS 1210 exchanges HO-ACK and a HO-confirm message with the Target BS 1220 in steps 1217, 1223 and 1225.

The MOB_BSHO-RSP message has a format shown in Table 1.

TABLE 1

| Type | Length | Value | Scope |
|------|--------|-------|-------|
| 2 | 1 | 0~255: code offset | MOB_BSHO-RSP |

The MS 1200 selects a ranging code for ranging with the Target BS 1220 in step 1221. The ranging code selection is made using Equation (6).

$$\text{ranging code index} = (\text{determined code index} + \text{received code offset}) \bmod 256 \quad (6)$$

That is, the MS 1200 selects a ranging code index by performing a modulo-256 operation on the value obtained by adding the code index determined in step 1207 to the code offset included in the MOB_BSHO-RSP message.

The MS 1200 sends the selected ranging code to the Target BS 1220 in step 1227. The Target BS 1220 verifies the MS corresponding to the received ranging code. The MS verification is achieved depending on the code index and code offset in step 1229.

The foregoing description given in FIG. 12 has been made on the assumption that before its handover, the MS previously has CID information that it will use after the handover. However, when the MS does not previously have the CID information before its handover, the MS can acquire the CID information as it receives an RNG-RSP message from the Target BS 1220 after the MS verification by the Target BS 1220.

As is apparent from the foregoing description, the present invention can provide a security-strengthened, simplified authentication procedure in the process of performing handover using the newly proposed partial CMAC value in a wireless mobile communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A handover method of a Mobile Station (MS) in a wireless mobile communication system, the method comprising:
   sending a handover request message to a Serving Base Station (BS);
   receiving a handover response message including handover Target BS information and an entire Cipher-based Message Authentication Code (CMAC) value corresponding to a first number of bits, from the Serving BS in response to the handover request message;
   storing a partial CMAC value corresponding to a second number of Most Significant Bit (MSB) bits in the entire CMAC value;
   sending to the Serving BS a handover indication message including the entire CMAC value and information on a Target BS to which the MS has determined to handover;
   selecting a ranging code using the partial CMAC value; and
   sending the selected ranging code to the Target BS.

2. The method of claim 1, further comprising:
   receiving a ranging response message indicating a successful authentication of the MS from the Target BS.

3. The method of claim 1, wherein the first number is 128 and the second number is 64.

4. The method of claim 1, wherein the ranging code is selected using the following equation, $$\text{code index} = f(\text{SAI}(64 \text{ bits}))$$

where f( ) denotes a preset function, and SAI denotes a partial CMAC value.

5. The method of claim 4, wherein the preset function comprises a modulo function.

6. The method of claim 1, wherein the ranging code is selected using the following equation, $$\text{code index} = g(\text{SAI}(64 \text{ bits}), (\text{LSB of}) \text{ frame number } (x \text{ bits}))$$

where g( ) denotes a function used for extracting a code index, SAI denotes a partial CMAC value,
   wherein one of all bits of the frame number and x Least Significant Bit (LSB) bits are used.

7. A handover support method of a Serving Base Station (BS) in a wireless mobile communication system, the method comprising:
   upon receiving a handover request message from a Mobile Station (MS), negotiating with handover candidate Target BSs whether to accept the handover of the MS;
   determining an entire Cipher-based Message Authentication Code (CMAC) value corresponding to a first number of bits;
   storing a partial CMAC value corresponding to a second number of Most Significant Bit (MSB) bits in the CMAC value; and sending a message including the stored partial CMAC value to a Target BS to which the MS can handover.

8. The method of claim 7, further comprising:
sending to the MS a handover response message including the entire CMAC value and information on the candidate Target BS to which the MS can handover;
receiving from the MS a handover indication message including the entire CMAC value information generated by the MS and the information on the Target BS to which the MS has determined to handover; and
sending to the Target BS a handover confirmation message including partial CMAC value information of the MS.

9. A method of a Target Base Station (BS) to which a Mobile Station (MS) has determined to handover in a wireless mobile communication system, the method comprising:
receiving from a Serving BS a message including a partial CMAC value corresponding to a second number of Most Significant Bit (MSB) bits in an entire Cipher-based Message Authentication Code (CMAC) value corresponding to a first number of bits;
receiving from the MS a ranging code that the MS has selected using the partial CMAC value; and
performing verification on the ranging code using the received ranging code and the partial CMAC value received from the Serving BS.

10. The method of claim 9, further comprising:
sending a request for an authentication key to an authentication station;
receiving an authentication key from the authentication station; and
transmitting a ranging response message to the MS corresponding to the received authentication key.

11. The method of claim 9, wherein the performing of the verification on the ranging code comprises:
comparing the ranging code received from the MS with a ranging code corresponding to a code index determined using the following equation to determine if they match, $$\text{code index}=f(\text{SAI}(64 \text{ bits}))$$

where f( ) denotes a preset function, and SAI denotes a partial CMAC value received from the Serving BS.

12. The method of claim 9, wherein the performing of the verification on the ranging code comprises:
comparing the ranging code received from the MS with a ranging code corresponding to a code index determined using the following equation to determine if they match, $$\text{code index}=g(\text{SAI}(64 \text{ bits}), (\text{LSB of}) \text{ frame number } (x \text{ bits}))$$

where g( ) denotes a function used for extracting a code index, SAI denotes a partial CMAC value,
wherein one of all bits of the frame number and x Least Significant Bit (LSB) bits are used.

13. A wireless mobile communication system, the system comprising:
a Mobile Station (MS);
a Serving Base Station (BS); and
a Target BS to which the MS has determined to handover, wherein the MS sends a handover request message to the Serving BS, receives a handover response message including handover Target BS information and an entire Cipher-based Message Authentication Code (CMAC) value corresponding to a first number of bits, from the Serving BS in response to the handover request message, stores a partial CMAC value corresponding to a second number of Most Significant Bit (MSB) bits in the entire CMAC value, sends a handover indication message including the entire CMAC value and the Target BS information to the Serving BS, selects a ranging code using the partial CMAC value, and sends the ranging code to the Target BS,
further wherein upon receiving a handover request message from the MS, the Serving BS negotiates with handover candidate Target BSs whether to accept the handover of the MS, determines an entire CMAC value corresponding to a first number of bits, stores a partial CMAC value corresponding to a second number of MSB bits in the entire CMAC value, and sends a message including the stored partial CMAC value to a Target BS to which the MS can handover.

14. The system of claim 13, wherein upon receiving the message including the partial CMAC value from the Serving BS, the Target BS receives from the MS a ranging code that the MS has selected using the partial CMAC value, and performs verification on the ranging code.

15. The system of claim 13, wherein the MS selects the ranging code using the following equation, $$\text{code index}=f(\text{SAI}(64 \text{ bits}))$$

where f( ) denotes a preset function, and SAI denotes a partial CMAC value.

16. The system of claim 15, wherein the preset function comprises a modulo function.

17. The system of claim 13, wherein the MS selects the ranging code using the following equation, $$\text{code index}=g(\text{SAI}(64 \text{ bits}), (\text{LSB of}) \text{ frame number } (x \text{ bits}))$$

where g( ) denotes a function used for extracting a code index, and SAI denotes a partial CMAC value,
wherein one of all bits of the frame number and x Least Significant Bit (LSB) bits are used.

18. A Fast Base Station Switching (FBSS) handover method of a Mobile Station (MS) in a wireless mobile communication system, the method comprising:
receiving from an Anchor Base Station (BS) a handover response message including information on a Target BS to which the MS can handover;
determining an entire Cipher-based Message Authentication Code (CMAC) value corresponding to a first number of bits;
storing a partial CMAC value corresponding to a second number of Most Significant Bit (MSB) bits in the entire CMAC value;
selecting a codeword using the partial CMAC value;
setting a value corresponding to some bits in the selected codeword as a short partial CMAC value; and
sending the set short partial CMAC value to the Target BS to which the MS has determined to handover.

19. The method of claim 18, wherein the ranging code is selected using the following equation, $$\text{code index}=f(\text{SAI}(64 \text{ bits}))$$

where f( ) denotes a preset function, and SAI denotes a partial CMAC value.

20. The method of claim 19, wherein the preset function comprises a modulo function.

21. The method of claim 18, wherein the ranging code is selected using the following equation, $$\text{code index}=g(\text{SAI}(64 \text{ bits}), (\text{LSB of}) \text{ frame number } (x \text{ bits}))$$

where g( ) denotes a function used for extracting a code index, SAI denotes a partial CMAC value, wherein one of all bits of the frame number and x Least Significant Bit (LSB) bits are used.

22. The method of claim 18, wherein the sending of the set short partial CMAC value to the Target BS to which the MS has determined to handover comprises:

sending Channel Quality Information (CQI) and the short partial CMAC value together to the Target BS over a channel.

23. A Fast Base Station Switching (FBSS) handover support method of a Target Base Station (BS) to which a Mobile Station (MS) has determined to handover in a wireless mobile communication system, the method comprising:

receiving from a Serving BS a message including a partial CMAC value corresponding to a second number of Most Significant Bit (MSB) bits in an entire Cipher-based Message Authentication Code (CMAC) value corresponding to a first number of bits;

selecting a codeword using one of a ranging code that the MS has selected using the partial CMAC value and the partial CMAC value;

receiving from the MS one of the selected ranging code and a value corresponding to some bits in the codeword as a short partial CMAC value; and performing verification on the MS based on the received short partial CMAC.

24. A handover method of a Mobile Station (MS) in a wireless mobile communication system, the method comprising:

determining an entire Cipher-based Message Authentication Code (CMAC) value corresponding to a first number of bits;

determining a code index using a partial CMAC value corresponding to a second number of Most Significant Bit (MSB) bits in the entire CMAC value;

selecting a ranging code using the determined code index; and sending the selected ranging code to a handover Target Base Station (BS).

25. The method of claim 24, wherein the code index is determined using any one of the following equations, $$\text{code index} = f(\text{SAI}(64 \text{ bits}))$$

$$\text{code index} = \text{SAI} \bmod 128$$

$$\text{code index} = g(\text{SAI } (64 \text{ bits}), (\text{LSB of}) \text{ frame number } (x \text{ bits}))$$

$$\text{code index} = (\text{SAI} | \text{LSB of frame number}) \bmod 128$$

where f( ) denotes a preset function which comprises a modulo function, SAI denotes a partial CMAC value, g( ) denotes a modulo function used for extracting a code index, wherein one of all bits of the frame number and x Least Significant Bit (LSB) bits are used.

26. The method of claim 24, wherein the ranging code is selected using the following equation, $$\text{ranging code index} = (\text{determined code index} + \text{code offset}) \bmod 256$$

where a code offset is received through a handover response message from a Serving BS from which the MS is receiving a service.

* * * * *